US012023578B2

(12) United States Patent
Yuan et al.

(10) Patent No.: US 12,023,578 B2
(45) Date of Patent: Jul. 2, 2024

(54) GAME EFFECT GENERATING METHOD AND APPARATUS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventors: Lin Yuan, Beijing (CN); Ruifeng Ma, Beijing (CN); Haozhe Li, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/991,659

(22) Filed: Nov. 21, 2022

(65) Prior Publication Data
US 2023/0091484 A1 Mar. 23, 2023

Related U.S. Application Data

(63) Continuation of application No. PCT/CN2021/094873, filed on May 20, 2021.

(30) Foreign Application Priority Data
May 21, 2020 (CN) .......................... 202010437683.2

(51) Int. Cl.
*A63F 13/46* (2014.01)
*A63F 13/85* (2014.01)
(52) U.S. Cl.
CPC .............. *A63F 13/46* (2014.09); *A63F 13/85* (2014.09); *A63F 2300/61* (2013.01)
(58) Field of Classification Search
CPC ....... A63F 13/46; A63F 13/85; A63F 2300/61
See application file for complete search history.

(56) References Cited

U.S. PATENT DOCUMENTS

| 6,504,990 B1 * | 1/2003 | Abecassis | .......... H04N 7/17318 348/E7.071 |
| 7,400,329 B2 * | 7/2008 | Edwards | ................. G06F 3/147 382/245 |

(Continued)

FOREIGN PATENT DOCUMENTS

| AU | 2012211340 A1 | 2/2013 |
| CN | 102508662 A | 6/2012 |

(Continued)

OTHER PUBLICATIONS

International Search Report and Written Opinion issued in International Patent Application No. PCT/CN2021/094873 dated Aug. 17, 2021.

(Continued)

*Primary Examiner* — Seng H Lim
(74) *Attorney, Agent, or Firm* — Astute IP Law Group (57) ABSTRACT

Embodiments of the present disclosure provide a method and an apparatus for generating a game effect, an electronic device, and a computer-readable medium, and the method includes following steps: acquiring an effect setting operation of a user, the effect setting operation including a setting operation of a multimedia material, a setting operation of a scoring rule, and a setting operation of an ending rule; and generating a configuration file of a game effect according to the multimedia material, the scoring rule, and the ending rule. The configuration file is used to indicate presentation of the game effect on a target video; and during the presentation of the game effect, the multimedia material is presented on the target video, scoring is performed and displayed according to the scoring rule, and a game is over in a case that the ending rule is satisfied.

18 Claims, 6 Drawing Sheets

(56) References Cited

U.S. PATENT DOCUMENTS

| | | | | |
|---|---|---|---|---|
| 7,548,242 | B1* | 6/2009 | Hughes | A63F 13/537 463/31 |
| 10,478,720 | B2* | 11/2019 | Gauthier | G06F 8/38 |
| 11,511,188 | B2* | 11/2022 | Wu | A63F 13/2145 |
| 11,511,200 | B2* | 11/2022 | Shi | A63F 13/65 |
| 11,582,536 | B2* | 2/2023 | Packard | H04N 21/25883 |
| 2003/0148806 | A1* | 8/2003 | Weiss | G07F 17/3232 463/20 |
| 2005/0020335 | A1* | 1/2005 | Weiss | G07F 17/323 463/9 |
| 2006/0084504 | A1* | 4/2006 | Chan | A63F 13/42 463/39 |
| 2007/0018997 | A1* | 1/2007 | Edwards | A63F 13/5375 345/605 |
| 2007/0060345 | A1* | 3/2007 | Edwards | A63F 13/45 463/31 |
| 2007/0060346 | A1* | 3/2007 | Edwards | A63F 13/30 463/31 |
| 2007/0113181 | A1* | 5/2007 | Blattner | G06Q 10/107 715/753 |
| 2007/0146372 | A1* | 6/2007 | Gee | G06T 13/20 345/474 |
| 2008/0026827 | A1 | 1/2008 | Skotarczak et al. | |
| 2009/0202114 | A1 | 8/2009 | Morin et al. | |
| 2011/0111818 | A1 | 5/2011 | Baerlocher | |
| 2011/0195779 | A1 | 8/2011 | Lau | |
| 2013/0165224 | A1* | 6/2013 | Ayoub | A63F 13/30 463/31 |
| 2015/0011309 | A1* | 1/2015 | Eloff | A63F 13/30 463/29 |
| 2015/0077331 | A1* | 3/2015 | Kasahara | G06T 19/006 345/156 |
| 2017/0256122 | A1* | 9/2017 | Takeda | G07F 17/3227 |
| 2018/0253141 | A1* | 9/2018 | McCracken | G06T 19/006 |
| 2019/0066451 | A1* | 2/2019 | Galfond | G07F 17/3288 |
| 2019/0371273 | A1 | 12/2019 | Benedetto et al. | |
| 2020/0147497 | A1* | 5/2020 | Mahlmeister | H04L 12/1827 |
| 2020/0188799 | A1* | 6/2020 | Croci | A63F 13/828 |
| 2021/0012675 | A1* | 1/2021 | Han | G16H 50/20 |
| 2021/0046382 | A1* | 2/2021 | Wu | A63F 13/2145 |
| 2021/0174690 | A1* | 6/2021 | Liu | G06F 3/016 |
| 2022/0339544 | A1* | 10/2022 | Elbert | A63F 13/79 |
| 2023/0032417 | A1* | 2/2023 | Luo | A63F 13/54 |

FOREIGN PATENT DOCUMENTS

| | | |
|---|---|---|
| CN | 103200177 A | 7/2013 |
| CN | 104008296 A | 8/2014 |
| CN | 108287718 A | 5/2017 |
| CN | 108014494 A | 5/2018 |
| CN | 109621425 A | 4/2019 |
| CN | 111124403 A | 5/2020 |
| JP | H07323160 A | 12/1995 |
| JP | 2000157724 A | 6/2000 |
| WO | 2018006071 A1 | 1/2018 |

OTHER PUBLICATIONS

Internet Source—https://www.bilibili.com/video/BV1W741127Em/?is_story_h5=false&p=3&share_from=ugc&shar_medium=android&share_plat=android&share_session_id=3d37fe72-7d1c-4c5c-8901-2f0acd55b115&share_source=WEIXIN&share_tag=s_i&timestamp=1668735565&unique_k=iTVeMAt.

Extended European Search Report in EP21809368.0, dated Jul. 6, 2023, 8 pages.

"Download Frontline", MacPeople, ASCII, Japan, vol. 12, No. 1, Issue 203, Jan. 1, 2006, 5 pages.

Communication pursuant to Article 94(3) EPC in European Patent Application No. 21809368.0, on Apr. 18, 2024, 6 pages.

* cited by examiner

GAME EFFECT GENERATING METHOD AND APPARATUS, ELECTRONIC DEVICE, AND COMPUTER READABLE MEDIUM

This application is a continuation of International Application No. PCT/CN2021/094873 filed on May 20, 2021, which claims the priority to and benefits of Chinese Patent Application No. 202010437683.2, filed on May 21, 2020. All the aforementioned patent applications are hereby incorporated by reference in their entireties.

TECHNICAL FIELD

Embodiments of the present disclosure relate to the technical field of computer application, and in particular to a method and an apparatus for generating a game effect, an electronic device, and a computer-readable medium.

BACKGROUND

With improvement of people's living standard, people pay more attention to the quality of life, and short videos have gradually become an indispensable part of people's entertainment and life. In recent years, the field of short videos has entered a stage of rapid development, and the popularity of short videos has also driven mini-games to become a hot spot in short videos.

SUMMARY

The section of summary is provided to briefly introduce the concepts, which will be described in detail later in the section of detailed description. The section of summary is neither intended to identify key features or essential features of the claimed technical solution, nor intended to limit the scope of the claimed technical solution.

The first aspect of the present disclosure provides a method for generating a game effect, including the following steps:

acquiring an effect setting operation of a user, wherein the effect setting operation comprises a setting operation of a multimedia material, a setting operation of a scoring rule, and a setting operation of an ending rule; and generating a configuration file of a game effect according to the multimedia material, the scoring rule, and the ending rule, wherein the configuration file is used to indicate presentation of the game effect on a target video; and during the presentation of the game effect, the multimedia material is presented on the target video, scoring is performed and displayed according to the scoring rule, and a game is over in a case that the ending rule is satisfied.

The second aspect of the present disclosure provides an apparatus for generating a game effect, including:

a first acquiring module, configured to acquire an effect setting operation of a user, wherein the effect setting operation comprises a setting operation of a multimedia material, a setting operation of a scoring rule, and a setting operation of an ending rule; and a first execution module, configured to generate a configuration file of a game effect according to the multimedia material, the scoring rule, and the ending rule, wherein the configuration file is used to indicate presentation of the game effect on a target video; and during the presentation of the game effect, the multimedia material is presented on the target video, scoring is performed and displayed according to the scoring rule, and a game is over in a case that the ending rule is satisfied.

The third aspect of the present disclosure provides an electronic device, the electronic device includes a memory and a processor, the memory is configured to store computer-readable instructions, and the computer-readable instructions, upon execution by the processor, cause the processor to perform steps of the above-mentioned method for generating a game effect.

The fourth aspect of the present disclosure provides a computer-readable medium, on which a computer program is stored, and the computer program, when executed by a processor, causes the processor to perform steps of the above-mentioned method for generating a game effect.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and that the components and elements are not necessarily drawn to scale.

DETAILED DESCRIPTION

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit these devices, modules or units to be different devices, modules or units, nor to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

The popularity of mini-games has accelerated the process of game upgrading. However, the implementation of logics in previous mini-games completely relies on scripts written by designers, and script writing is slow. Moreover, most mini-games adopt the same game logics, and repeated scripting increases the workload of designers and makes the development of mini-games inefficient.

The technical solutions of the present disclosure and how the technical solutions of the present disclosure solve the above-mentioned technical problems will be described in detail below with specific embodiments. The following specific embodiments may be combined with each other, and the same or similar concepts or processes may not be repeated in some embodiments. The embodiments of the present disclosure will be described below with reference to the drawings.

Figure 1:
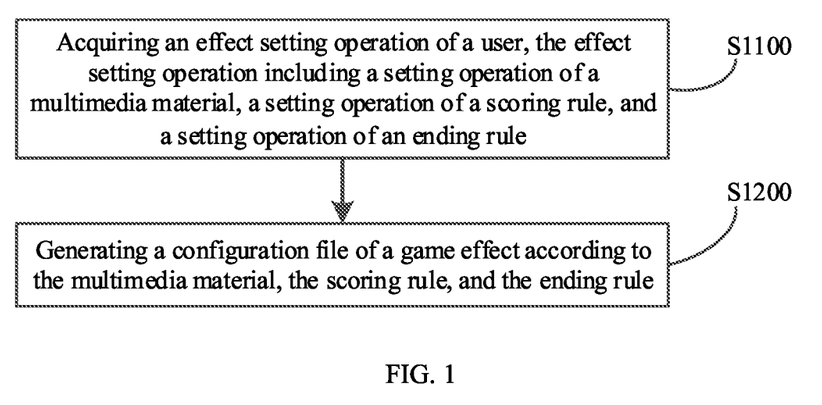
FIG. 1 a basic flowchart of a method for generating a game effect according to an embodiment of the present disclosure.

Referring to FIG. 1, the present disclosure provides a method for generating a game effect, and the method may be performed specifically by an electronic device. The electronic device may be a terminal device, and the terminal device may be a desktop device or a mobile device. The method for generating a game effect provided by the present disclosure includes:

Step S1100: acquiring an effect setting operation of a user, the effect setting operation including a setting operation of a multimedia material, a setting operation of a scoring rule, and a setting operation of an ending rule.

Figure 5:
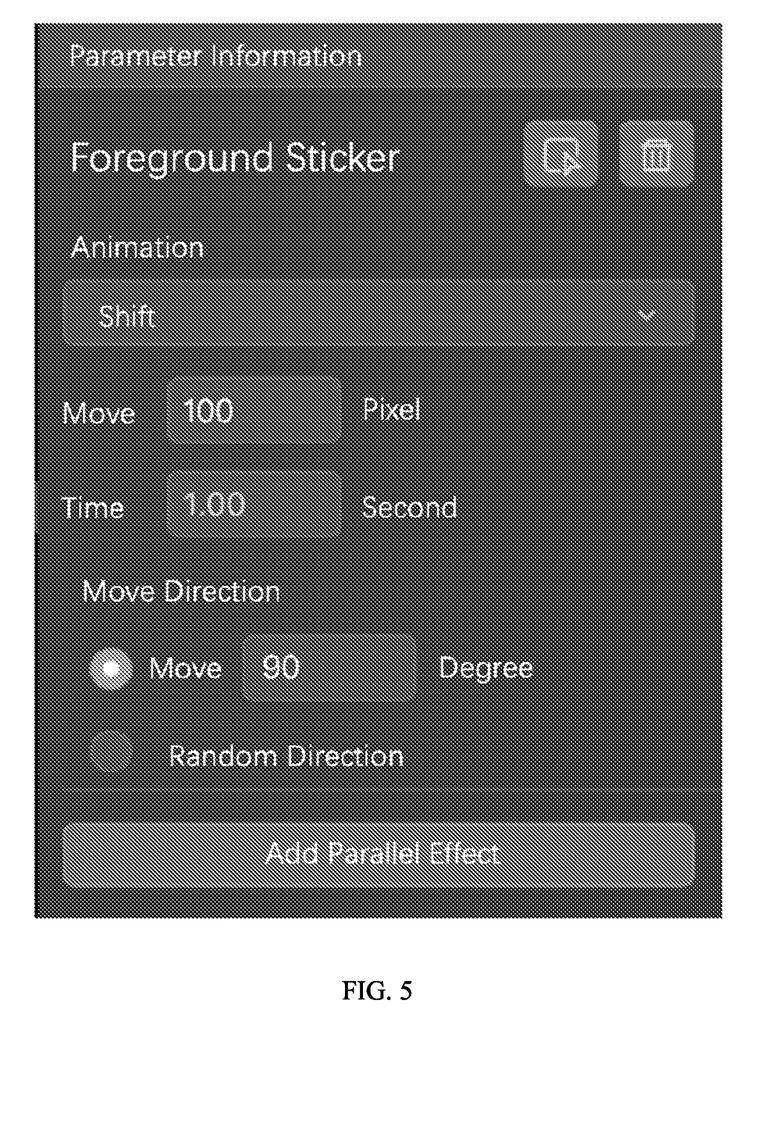
FIG. 5 is a schematic diagram of a setting interface of a multimedia material according to an embodiment of the present disclosure.

In some embodiments, a system can provide a game producing interface for the user to operate and set up, and the user may set the multimedia material, the scoring rule, the ending rule, and the like in the game producing interface. During implementation, the setting operation of the multimedia material includes setting operations of the multimedia material and a movement pattern of the multimedia material. In some optional embodiments, the setting operation of the movement pattern of the multimedia material includes setting a movement direction and a movement speed of the multimedia material, an operating mode of the multimedia material, or the like. Taking a submarine mini-game produced in an embodiment of the game effect generating method provided in the present disclosure as an example, referring to FIG. 4 to FIG. 8, in the submarine mini-game, the multimedia material includes pillars and a submarine, and the user can set foreground stickers of the multimedia material through a setting interface of the multimedia material as illustrated in FIG. 5, where the foreground stickers are display stickers of the multimedia material. For example, in the submarine mini-game, the foreground stickers of the multimedia material are the submarine and the pillars. Of course, the foreground stickers of the multimedia material also include other display stickers, such as the submarine in the submarine mini-game being replaced with a shark sticker or alien flying saucer sticker. The user can set the foreground stickers of the multimedia material on his or her own.

Figure 6:
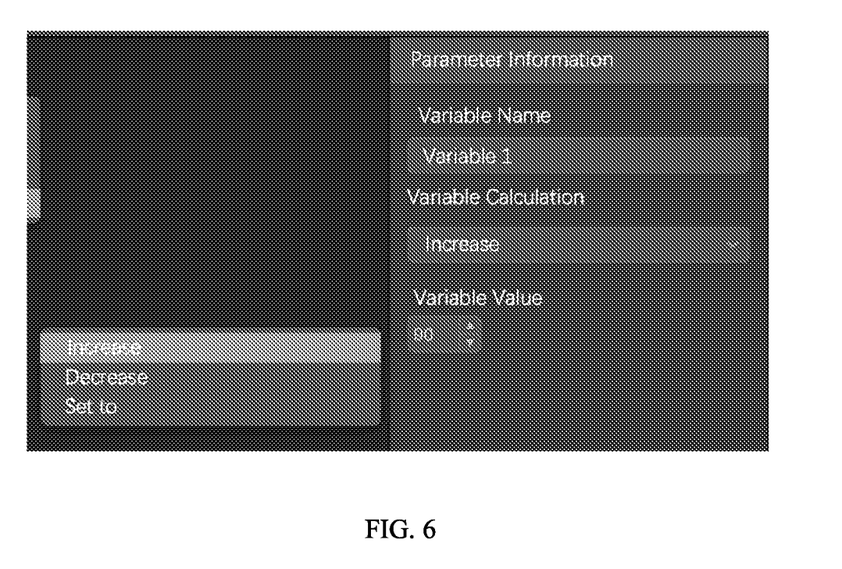
FIG. 6 is a schematic diagram of a setting interface of variables of a scoring rule according to an embodiment of the present disclosure.
Figure 7:
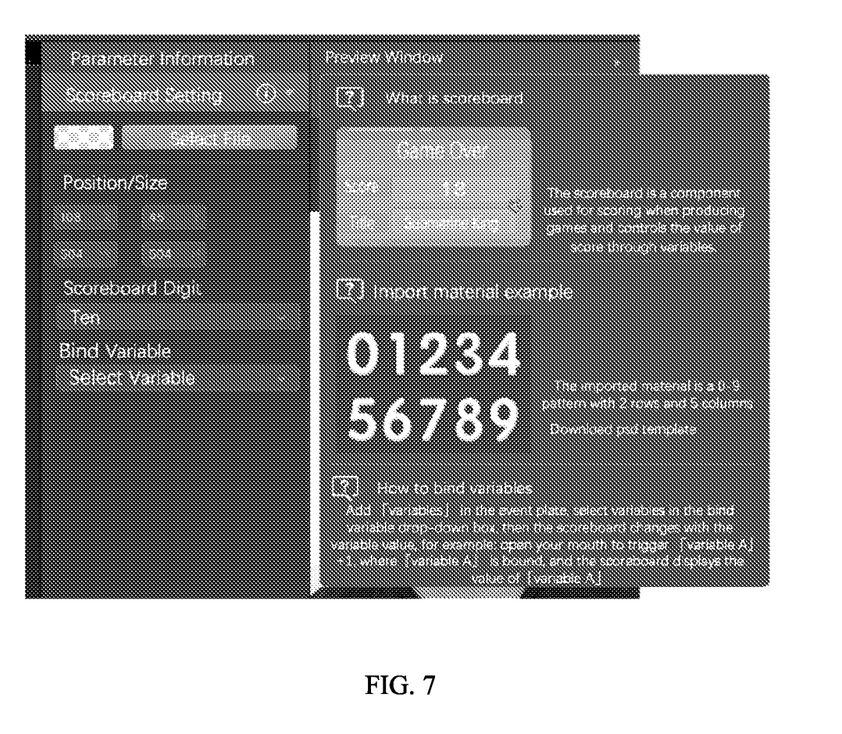
FIG. 7 is a schematic diagram of a setting interface of a scoreboard according to an embodiment of the present disclosure.
Figure 8:
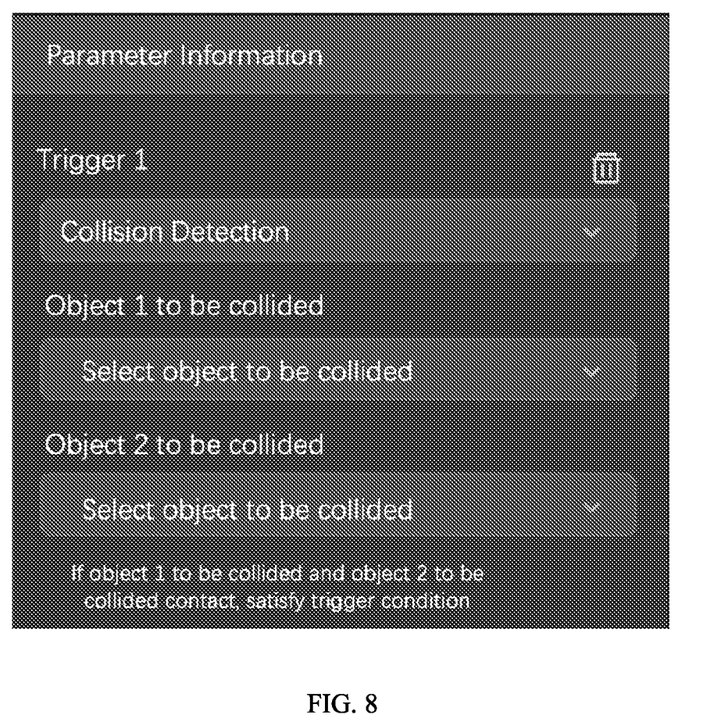
FIG. 8 is a schematic diagram of a setting interface of collision detection according to an embodiment of the present disclosure.

In some embodiments, referring to FIG. 6 and FIG. 7, the user may set a scoring rule through setting interfaces as illustrated in FIG. 6 and FIG. 7. The setting operation of the scoring rule includes, but is not limited to, setting of variables, setting of variable calculation, setting of variable values, and setting of scoring display. The setting of scoring display includes, but is not limited to, setting of a scoreboard, setting of scoreboard position/size, setting of scoreboard digits, and setting of bind variables. In some embodiments, referring to FIG. 8, the user may set the ending rule through a setting interface as illustrated in FIG. 8. Taking the submarine mini-game as an example, collision detection between the submarine and the pillars is set. When the submarine crosses a pillar and does not collide with the pillar, the scoreboard shows an increase in the score; and when the submarine collides with the pillar, the game is over and a final game score is displayed. In some embodiments, other objects may be set as the object to be collided, which can be specifically set by the user. For example, the object to be collided may be a screen edge, an image of human face, an image of a human hand, or the like.

In the present disclosure, the technical solution is mainly described by the setting operation of the multimedia material, the setting operation of the scoring rule, and the setting operation of the ending rule. However, in practice, other effect setting operations may be freely set according to the needs. For example, the setting operation of the multimedia material may also include a setting operation of game starting, and a game starting method includes, but is not limited to, voice-control activation, gesture activation, blink activation, or the like.

Step S1200: generating a configuration file of a game effect according to the multimedia material, the scoring rule, and the ending rule.

The system generates the configuration file of the game effect according to the multimedia material, the scoring rule and the ending rule. During implementation, the system respectively acquires multimedia material parameters, scoring rule parameters and ending rule parameters according to the setting operation of the multimedia material, the setting operation of the scoring rule and the setting operation of the ending rule of the user. Taking the submarine mini-game as an example, the multimedia material parameters include a moving direction and a moving speed of the pillars, and an operating mode of the submarine, the scoring rule parameters include scoreboard parameters and a scoring algorithm, and the ending rule parameters include objects of collision detection. During implementation, the system acquires a preset original configuration file and then saves the multimedia material parameters, the scoring rule parameters and the ending rule parameters into an element configuration file to obtain the configuration file of the game effect.

After the system generates the configuration file, the configuration file is used to indicate presentation of the game effect on a target video. During the presentation of the game effect, the multimedia material is presented on the target video, scoring is performed and displayed according to the scoring rule, and the game is over in the case that the ending rule is satisfied.

Taking a jump game as an example, in the jump game, there are squares spaced at a certain distance from each other and a chess piece, and a chess piece jumping distance is controlled by clicking on the screen, so that the chess piece is controlled to jump to the next square. The system acquires the effect setting operation of the user for the jump game. The multimedia material includes the chess piece and squares, and the setting operation of the multimedia material includes a setting operation of the chess piece and squares, such as setting an operation mode of the chess piece, in which the chess piece jumping distance can be controlled through a sound duration. The scoring rule is to add one point when the chess piece jumps to the next square. The ending rule is to end the game when the chess piece falls down. The system generates a configuration file of the game effect of the jump game based on the multimedia material, the scoring rule, and the ending rule.

According to the embodiments, the effect setting operation of the user, which includes the setting operations of the multimedia material, the scoring rule and the ending rule, is acquired, and the configuration file of the game effect based on the multimedia material, the scoring rule, and the ending rule is generated. The configuration file is used to indicate the presentation of the corresponding game effect on a target video. During the presentation of the game effect, the multimedia material is presented on the target video, scoring is performed and displayed according to the scoring rule, and the game is over when the ending rule is satisfied. The process of producing a game effect in the embodiments only requires the user to participate in the setting of the multimedia material, the scoring rule and the ending rule in the game, and does not require the user to develop and write a game logic script, thereby reducing the workload of the user and effectively improving the efficiency of game development.

It should be noted that in the present disclosure, a "game effect" refers to a special effect produced by, for example, computer software that does not generally appear in reality, or may also refer to a special effect or a trick effect artificially made in the game. The game effect includes, for example, a visual effect, a sound effect, etc.

In an optional embodiment, the multimedia material is set with a corresponding movement pattern.

During the presentation of the game effect, the multimedia material is presented on the target video according to the corresponding movement pattern of the multimedia material, scoring is performed and displayed based on the scoring rule in accordance with movement of the multimedia material, and the movement of the multimedia material is stopped in the case that the ending rule is satisfied.

During implementation, the user may set the movement pattern of the multimedia material. Taking the submarine mini-game as an example, the multimedia material includes the submarine and pillars, a pillar multimedia material refers to a long scroll image containing N pillars, N≥2, and the user sets a moving direction and a moving speed of the pillar multimedia material, so that the system presents the pillar multimedia material on the target video according to the moving direction and moving speed of the pillar multimedia material set by the user. For example, the moving speed of the pillar multimedia material may be calculated based on moving pixel points of the material and the time consumed. The movement pattern of the submarine includes an operating mode of the submarine. For example, the user sets the submarine to move by following a captured face image, and thus the system displays the submarine following the face image on the target video, and scores and displays the scoring in the movement process of the submarine and the pillars, for example, adding one point if the submarine does not collide with the pillars, and ending the movement of the multimedia material if the submarine collides with the pillars.

In an optional embodiment, the multimedia material includes a first image material, a movement pattern corresponding to the first image material specifically includes the first image material moving at a preset movement speed and in a preset movement direction, and a setting operation of the first image material is specifically used for setting the first image material, the preset movement speed, and the preset movement direction.

During implementation, the multimedia material includes the first image material, and the setting operation of the multimedia material includes the setting operation of the first image material. Specifically, the setting operation of the first image material is used for setting the first image material, the preset movement speed and the preset movement direction. As illustrated in FIG. 5, the user may set the first image material by setting the foreground stickers. Taking the submarine mini-game as an example, the user sets the pillars as the foreground stickers, and the pillars are the first image material. The preset movement speed can be achieved based on the moving pixels and the time consumed, and the preset movement direction can be set by setting a moving angle or set to a random direction. The system obtains the movement pattern of the first image material based on the first image material, the preset movement speed and the preset movement direction in the setting operation of the first image material, so as to enable the first image material to move according to the preset movement speed and preset movement direction during the presentation of the game effect.

In an optional embodiment, the multimedia material includes a second image material, a movement pattern corresponding to the second image material specifically includes the second image material moving by following a target object identified in the target video, and a setting operation of the second image material is specifically used for setting the second image material and the target object.

During implementation, the multimedia material includes the second image material, and the setting operation of the multimedia material includes the setting operation of the second image material. Specifically, the setting operation of the second image material is used for setting the second image material and the target object. Taking the submarine mini-game as an example, the user sets the submarine as the second image material, sets a face image as the target object, and sets the movement pattern of the submarine to follow the movement of the face image. The system sets the second image material and the target object based on the setting operation of the second image material, thereby obtaining the movement pattern of the second image material, so as to enable the second image material to move in accordance with the target object identified in the target video during the presentation of the game effect.

In an optional embodiment, the scoring rule includes a scoring condition and a scoring algorithm.

During the presentation of the game effect, scoring is performed according to the scoring algorithm in the case that a movement state of the multimedia material reaches the scoring condition.

During implementation, the scoring condition refers to a state of the multimedia material, and the scoring algorithm is used to calculate the game score. During implementation, the scoring algorithm includes variables and a scoreboard, where the variables are used to record a game score and the scoreboard is used to display the game score. Taking the submarine mini-game as an example, the scoring condition is that the submarine crosses one pillar and does not collide with the pillar, and the variables refer to the number of times the submarine crosses the pillar. In the presentation of the game effect, in the case that the movement state of the submarine and the pillars satisfies the scoring condition, the scoring is performed according to the scoring algorithm and displayed through the scoreboard.

In an optional embodiment, the ending rule is implemented specifically under the scoring condition.

During the presentation of the game effect, the game is over in the case that the movement state of the multimedia material does not satisfy the scoring condition.

During implementation, taking the submarine mini-game as an example, when the submarine collides with the pillar, the movement state of the multimedia material is considered not to meet the scoring condition, and the movement state of the multimedia material can be monitored by collision detection. During implementation, the collision detection can be achieved by pixel point detection, for example, when any one pixel point of the submarine overlaps with any one pixel point of the pillar, the submarine and the pillar are considered to have a collision. During the presentation of the game effect, the game is over in the case that the movement state of the submarine and the pillar does not meet the scoring condition, and the final game score is displayed.

In some optional embodiments, the effect setting operation of the user further includes a setting operation of a sharing rule.

During the presentation of the game effect, a sharing image for presenting the scoring is generated and shared to a designated platform if the scoring satisfies the sharing rule.

The user can also set a sharing rule in the game producing interface, such as setting a sharing condition and a link to the sharing platform. During the presentation of the game effect, when the game is over, it detects whether the scoring meets the sharing rule. For example, when the scoring exceeds the current highest score record, a screenshot of the current screen is taken or a current game frame image is saved as the sharing image, and the sharing image is shared to the designated platform to improve the fun of the game.

To solve the above technical problems, an embodiment of the present disclosure further provides an apparatus for generating a game effect.

Figure 2:
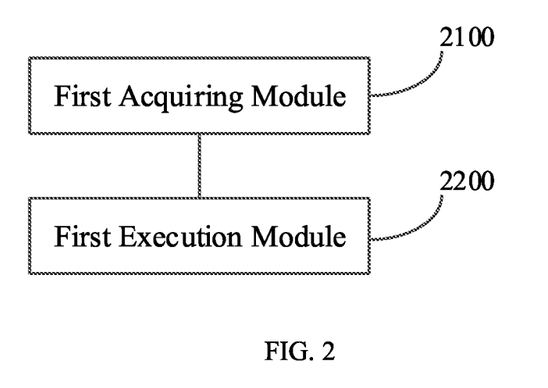
FIG. 2 is a basic schematic structural diagram of an apparatus for generating a game effect according to an embodiment of the present disclosure.

Specifically referring to FIG. 2, FIG. 2 is a schematic diagram of a basic structure of an apparatus for generating a game effect in the embodiment.

As illustrated in FIG. 2, the apparatus for generating a game effect includes a first acquiring module 2100 and a first execution module 2200. The first acquiring module 2100 is used to acquire an effect setting operation of a user, the effect setting operation including a setting operation of a multimedia material, a setting operation of a scoring rule, and a setting operation of an ending rule. The first execution module 2200 is used to generate a configuration file of a game effect according to the multimedia material, the scoring rule, and the ending rule. The configuration file is used to indicate presentation of the game effect on a target video. During the presentation of the game effect, the multimedia material is presented on the target video, scoring is performed and displayed according to the scoring rule, and a game is over in the case that the ending rule is satisfied.

According to the embodiment, the effect setting operation of the user, which includes the setting operations of the multimedia material, the scoring rule and the ending rule, is acquired, and the configuration file of the game effect based on the multimedia material, the scoring rule, and the ending rule is generated. The configuration file is used to indicate the presentation of the corresponding game effect on a target video. During the presentation of the game effect, the multimedia material is presented on the target video, scoring is performed and displayed according to the scoring rule, and the game is over when the ending rule is satisfied. The process of producing a game effect in the embodiment only requires the user to participate in the setting of the multimedia material, the scoring rule and the ending rule in the game, and does not require the user to develop and write a game logic script, thereby reducing the workload of the user and effectively improving the efficiency of game development.

In some implementations, the apparatus for generating a game effect further includes: the multimedia material is set with a corresponding movement pattern.

During the presentation of the game effect, the multimedia material is presented on the target video according to the corresponding movement pattern of the multimedia material, scoring is performed and displayed according to the scoring rule in accordance with movement of the multimedia material, and the movement of the multimedia material is stopped in the case that the ending rule is satisfied.

In some implementations, the apparatus for generating a game effect further includes: the multimedia material includes a first image material; a movement pattern corresponding to the first image material is specifically the first image material moving at a preset movement speed and in a preset movement direction; and a setting operation of the first image material is specifically used for setting the first image material, the preset movement speed, and the preset movement direction.

In some implementations, the apparatus for generating a game effect further includes: the multimedia material includes a second image material; a movement pattern corresponding to the second image material is specifically the second image material moving by following a target object identified in the target video; and a setting operation of the second image material is specifically used for setting the second image material and the target object.

In some implementations, the apparatus for generating a game effect further includes: the scoring rule includes a scoring condition and a scoring algorithm.

During the presentation of the game effect, scoring is performed according to the scoring algorithm in the case that a movement state of the multimedia material reaches the scoring condition.

In some implementations, the apparatus for generating a game effect further includes: the ending rule is implemented specifically under the scoring condition.

During the presentation of the game effect, the game is over in the case that the movement state of the multimedia material does not reach the scoring condition.

In some implementations, the apparatus for generating a game effect further includes: the effect setting operation of the user further includes a setting operation of a sharing rule.

During the presentation of the game effect, a sharing image for presenting the scoring is generated and shared to a designated platform if the scoring satisfies the sharing rule.

For the apparatus in the foregoing embodiments, the specific methods of modules performing the operations have been described in detail in the method embodiments, and no detailed description is further provided herein.

Figure 3:
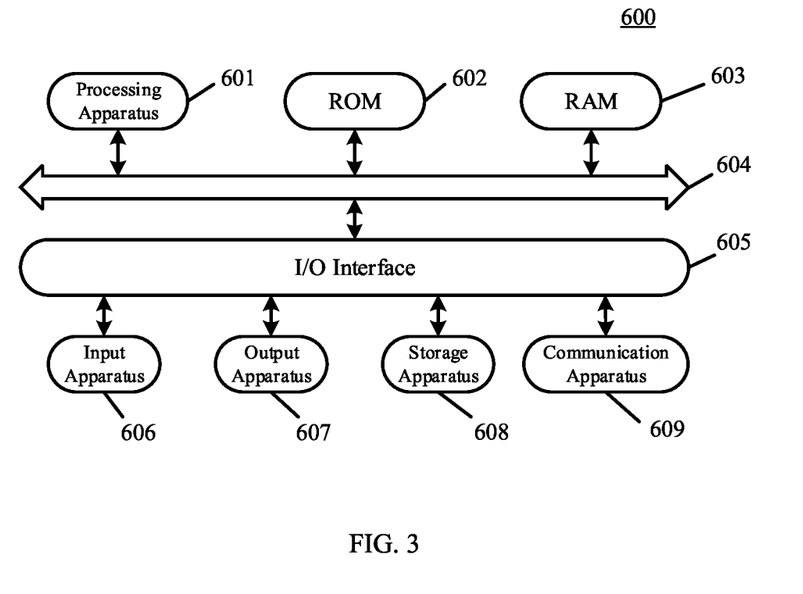
FIG. 3 is a basic structural block diagram of an electronic device according to an embodiment of the present disclosure.
Figure 4:
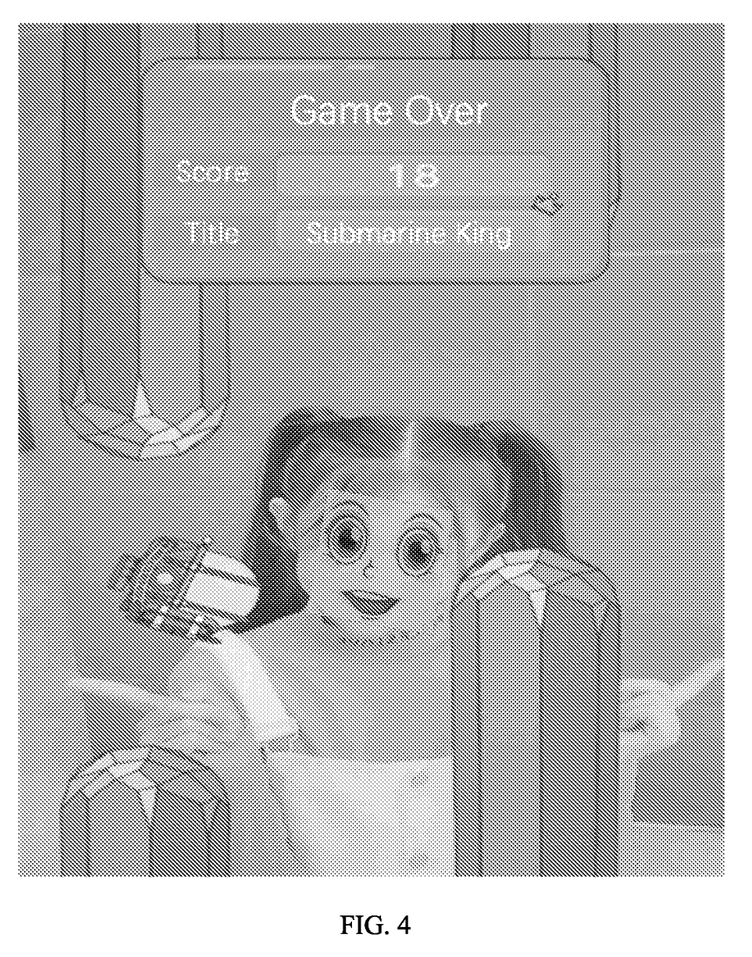
FIG. 4 is a schematic diagram of an interface of a submarine mini-game according to an embodiment of the present disclosure.

Referring to FIG. 3, FIG. 3 illustrates a schematic structural diagram of an electronic device 600 suitable for implementing some embodiments of the present disclosure. The electronic devices or terminal devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital TV, a desktop computer, or the like. The electronic device illustrated in FIG. 3 is merely an example, and should not pose any limitation to the functions and the range of use of the embodiments of the present disclosure.

The electronic device includes a memory and a processor, where the processor here may be referred to as a processing apparatus 601 described below, and the memory may include at least one selected from a group consisting of a read-only memory (ROM) 602, a random access memory (RAM) 603, and a storage apparatus 608 hereinafter. The details are as follows.

As illustrated in FIG. 3, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 3 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowchart may be implemented as a computer software program. For example, some embodiments of the present disclosure include a computer program product, which includes a computer program carried by a non-transitory computer-readable medium. The computer program includes program codes for performing the method shown in the flowchart. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the method of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-described computer-readable medium carries one or more programs, and when the one or more programs are executed by the electronic device, the electronic device is caused to: acquire an effect setting operation of a user, wherein the effect setting operation includes a setting operation of a multimedia material, a setting operation of a scoring rule, and a setting operation of an ending rule; and generating a configuration file of a game effect according to the multimedia material, the scoring rule, and the ending rule, wherein the configuration file is used to indicate presentation of the game effect on a target video; and during the presentation of the game effect, the multimedia material is presented on the target video, scoring is performed and displayed according to the scoring rule, and a game is over in a case that the ending rule is satisfied.

The computer program codes for performing the operations of the present disclosure may be written in one or more programming languages or a combination thereof. The above-described programming languages include but are not limited to object-oriented programming languages such as Java, Smalltalk, C++, and also include conventional procedural programming languages such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquiring module may also be described as "acquiring data parameters in the shared data to be transmitted."

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, a method for generating a game effect is provided and includes the following steps:

acquiring an effect setting operation of a user, wherein the effect setting operation comprises a setting operation of a multimedia material, a setting operation of a scoring rule, and a setting operation of an ending rule; and generating a configuration file of a game effect according to the multimedia material, the scoring rule, and the ending rule, wherein the configuration file is used to indicate presentation of the game effect on a target video; and during the presentation of the game effect, the multimedia material is presented on the target video, scoring is performed and displayed according to the scoring rule, and a game is over in a case that the ending rule is satisfied.

In the embodiments of the present disclosure, the multimedia material is set with a corresponding movement pattern; and during the presentation of the game effect, the multimedia material is presented on the target video according to the corresponding movement pattern of the multimedia material, scoring is performed and displayed according to the scoring rule in accordance with movement of the multimedia material, and the movement of the multimedia material is stopped in the case that the ending rule is satisfied.

In the embodiments of the present disclosure, the multimedia material comprises a first image material; a movement pattern corresponding to the first image material specifically comprises: the first image material moving at a preset movement speed and in a preset movement direction; and a setting operation of the first image material is specifically configured for setting the first image material, the preset movement speed, and the preset movement direction.

In the embodiments of the present disclosure, the multimedia material comprises a second image material; a movement pattern corresponding to the second image material specifically comprises: the second image material moving by following a target object identified in the target video; and a setting operation of the second image material is specifically configured for setting the second image material and the target object.

In the embodiments of the present disclosure, the scoring rule comprises a scoring condition and a scoring algorithm; and during the presentation of the game effect, scoring is performed according to the scoring algorithm in a case that a movement state of the multimedia material reaches the scoring condition.

In the embodiments of the present disclosure, the ending rule is implemented specifically under the scoring condition:

during the presentation of the game effect, ending the game in a case that the movement state of the multimedia material does not reach the scoring condition.

In the embodiments of the present disclosure, the effect setting operation of the user further comprises a setting operation of a sharing rule, wherein during the presentation of the game effect, a sharing image for presenting the scoring is generated and shared to a designated platform if the scoring satisfies the sharing rule.

According to one or more embodiments of the present disclosure, an apparatus for generating a game effect is further provided and includes:

a first acquiring module, configured to acquire an effect setting operation of a user, wherein the effect setting operation comprises a setting operation of a multimedia material, a setting operation of a scoring rule, and a setting operation of an ending rule; and a first execution module, configured to generate a configuration file of a game effect according to the multimedia material, the scoring rule, and the ending rule, wherein the configuration file is used to indicate presentation of the game effect on a target video; and during the presentation of the game effect, the multimedia material is presented on the target video, scoring is performed and displayed according to the scoring rule, and a game is over in a case that the ending rule is satisfied.

In the embodiments of the present disclosure, the multimedia material is set with a corresponding movement pattern; and during the presentation of the game effect, the multimedia material is presented on the target video according to the corresponding movement pattern of the multimedia material, scoring is performed and displayed according to the scoring rule in accordance with movement of the multimedia material, and the movement of the multimedia material is stopped in the case that the ending rule is satisfied.

In the embodiments of the present disclosure, the apparatus for generating a game effect further includes: the multimedia material comprises a first image material; a movement pattern corresponding to the first image material specifically comprises: the first image material moving at a preset movement speed and in a preset movement direction; and a setting operation of the first image material is specifically configured for setting the first image material, the preset movement speed, and the preset movement direction.

In the embodiments of the present disclosure, the apparatus for generating a game effect further includes: the multimedia material comprises a second image material; a movement pattern corresponding to the second image material specifically comprises: the second image material moving by following a target object identified in the target video; and a setting operation of the second image material is specifically configured for setting the second image material and the target object.

In the embodiments of the present disclosure, the apparatus for generating a game effect further includes: the scoring rule comprises a scoring condition and a scoring algorithm; and during the presentation of the game effect, scoring is performed according to the scoring algorithm in a case that a movement state of the multimedia material reaches the scoring condition.

In the embodiments of the present disclosure, the apparatus for generating a game effect further includes: the ending rule is implemented specifically under the scoring condition:

during the presentation of the game effect, ending the game in a case that the movement state of the multimedia material does not reach the scoring condition.

In the embodiments of the present disclosure, the apparatus for generating a game effect further includes: the effect setting operation of the user further comprises a setting operation of a sharing rule, wherein during the presentation of the game effect, a sharing image for presenting the scoring is generated and shared to a designated platform if the scoring satisfies the sharing rule.

According to one or more embodiments of the present disclosure, an electronic device is further provided and includes a memory and a processor, the memory is configured to store computer-readable instructions, and the computer-readable instructions, upon execution by the processor, cause the processor to perform steps of the above-mentioned method for generating a game effect.

According to one or more embodiments of the present disclosure, a computer-readable medium is further provided, on which a computer program is stored, and the computer program, when executed by a processor, causes the processor to perform steps of the above-mentioned method for generating a game effect.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

What is claimed is:

1. A method for generating a game effect, comprising:
   acquiring an effect setting operation of a user, wherein the effect setting operation comprises a setting operation of a multimedia material, a setting operation of a scoring rule, and a setting operation of an ending rule;
   in response to the effect setting operation, acquiring an original configuration file for a game and updating the original configuration tile according to the multimedia material, the scoring ride, and the ending rule to generate a game-effect con figuration file for the game; and presenting a game effect on a target video during the game, wherein the game effect is indicated by the game-effect configuration file, wherein as indicated by the game-effect configuration file, the multimedia material is presented on the target video according to a corresponding movement pattern. of the multimedia material, scoring for the game is performed and displayed according to the scoring rule, and whether the game is over is determined according to the ending rule; and the multimedia material comprises a second image material, a movement pattern corresponding to the second image material comprises allowing the second image material to move in the target video by following a movement of a target object, the movement of the target object is obtained by capturing an image of the target object in real time through an input apparatus, and a setting operation of the second image material is configured for setting the second image material and the target object.

2. The method for generating a game effect according to claim 1, wherein the multimedia material is set with the corresponding movement pattern; and during presentation of the game effect, scoring is performed and displayed according to the scoring rule in accordance with movement of the multimedia material, and the movement of the multimedia material is stopped in a case that the ending rule is satisfied.

3. The method for generating a game effect according to claim 2, wherein the multimedia material comprises a first image material;

a movement pattern corresponding to the first image material comprises: the first image material moving at a preset movement speed and in a preset movement direction; and a setting operation of the first image material is configured for setting the first image material, the preset movement speed, and the preset movement direction.

4. The method for generating a game effect according to claim 2, wherein the scoring rule comprises a scoring condition and a scoring algorithm; and during the presentation of the game effect, scoring is performed according to the scoring algorithm in a case that a movement state of the multimedia material reaches the scoring condition.

5. The method for generating a game effect according to claim 2, wherein the effect setting operation of the user further comprises a setting operation of a sharing rule, wherein during the presentation of the game effect, a sharing image for presenting the scoring is generated and shared to a designated platform if the scoring satisfies the sharing rule.

6. The method for generating a game effect according to claim 1, wherein the multimedia material comprises a first image material;

a movement pattern corresponding to the first image material comprises: the first image material moving at a preset movement speed and in a preset movement direction; and a setting operation of the first image material is configured for setting the first image material, the preset movement speed, and the preset movement direction.

7. The method for generating a game effect according to claim 1, wherein the scoring rule comprises a scoring condition and a scoring algorithm; and during presentation of the game effect, scoring is performed according to the scoring algorithm in a case that a movement state of the multimedia material reaches the scoring condition.

8. The method for generating a game effect according to claim 7, wherein the ending rule comprises:

during the presentation of the game effect, ending the game in a case that the movement state of the multimedia material does not reach the scoring condition.

9. The method for generating a game effect according to claim 1, wherein the effect setting operation of the user further comprises a setting operation of a sharing rule, wherein during presentation of the game effect, a sharing image for presenting the scoring is generated and shared to a designated platform if the scoring satisfies the sharing rule.

10. An electronic device, comprising:

a memory and a processor, wherein the memory is configured to store computer-readable instructions, and the computer-readable instructions, upon execution by the processor, cause the processor to perform steps of the method for generating a game effect according to claim 1.

11. A non-transitory computer-readable medium, on which a computer program is stored, wherein the computer program, when executed by a processor, causes the processor to perform steps of the method for generating a game effect according to claim 1.

12. The method for generating a game effect according to claim 1, wherein the target object comprises a face image of a user.

13. An apparatus for generating a game effect, comprising:

a first acquiring module, configured to acquire an effect setting operation of a user, wherein the effect setting operation comprises a setting operation of a multimedia material, a setting operation of a scoring rule, and a setting operation of an ending rule;

a first execution module, configured to acquire an original configuration file for a game and update the original configuration file according to the multimedia material, the scoring rule, and the ending rule to generate a game-effect configuration tile for the game; and a second execution module, configured to present a game effect on a target video during the game, wherein the game effect is indicated by the game-effect configuration file, wherein as indicated by the game-effect configuration file, the multimedia material is presented on the target video according to a corresponding movement pattern of the multimedia material, scoring for the game is performed and displayed according to the scoring rule, and whether the game is over is determined according to the ending rule; and the multimedia material comprises a second image material, a movement pattern corresponding to the second image material comprises allowing the second image material to move in the target video by following a movement of a target object, the movement of the target object is obtained by capturing an image of the target object in real time through an input apparatus , and a setting operation of the second image material is configured for setting the second image material and the target object.

14. The apparatus for generating a game effect according to claim 13, wherein the multimedia material is set with the corresponding movement pattern; and during presentation of the game effect, scoring is performed and displayed according to the scoring rule in accordance with movement of the multimedia material, and the movement of the multimedia material is stopped in a case that the ending rule is satisfied.

15. The apparatus for generating a game effect according to claim 13, wherein the multimedia material comprises a first image material;

a movement pattern corresponding to the first image material comprises: the first image material moving at a preset movement speed and in a preset movement direction; and a setting operation of the first image material is configured for setting the first image material, the preset movement speed, and the preset movement direction.

16. The apparatus for generating a game effect according to claim 13, wherein the scoring rule comprises a scoring condition and a scoring algorithm: and during presentation of the game effect, scoring is performed according to the scoring algorithm in a case that a movement state of the multimedia material reaches the scoring condition.

17. The apparatus for generating a game effect according to claim 16, wherein the ending rule comprises:

during the presentation of the game effect, ending the game in a case that the movement state of the multimedia material does not reach the scoring condition.

18. The apparatus for generating a game effect according to claim 13, wherein the effect setting operation of the user further comprises a setting operation of a sharing rule, wherein during presentation of the game effect, a sharing image for presenting the scoring is generated and shared to a designated platform if the scoring satisfies the sharing rule.

\* \* \* \* \*